Figure 1:
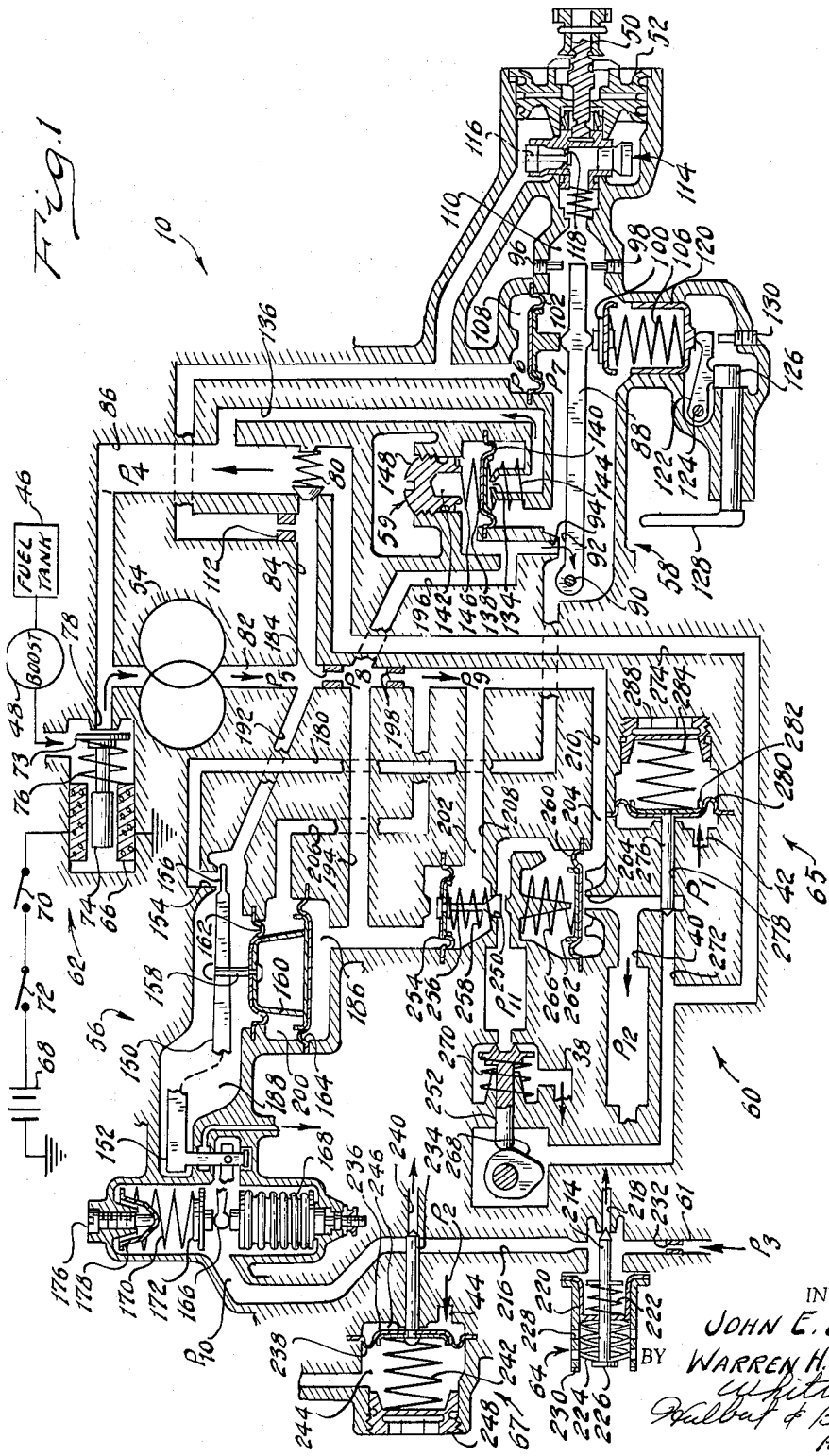

April 19, 1966

J. E. SMITH ETAL 3,246,470

GAS TURBINE FUEL CONTROL

Filed March 25, 1963

2 Sheets-Sheet 1

INVENTORS.
JOHN E. SMITH
WARREN H. COWLES
BY
ATTORNEYS

April 19, 1966   J. E. SMITH ETAL   3,246,470
GAS TURBINE FUEL CONTROL
Filed March 25, 1963                        2 Sheets-Sheet 2

INVENTORS.
JOHN E. SMITH
BY WARREN H. COWLES
ATTORNEYS.

3,246,470
GAS TURBINE FUEL CONTROL
John E. Smith, Rochester, and Warren H. Cowles, Birmingham, Mich., assignors to Holley Carburetor Company, Warren, Mich., a corporation of Michigan
Filed Mar. 25, 1963, Ser. No. 267,748
16 Claims. (Cl. 60—39.17)

The invention relates to fuel controls and refers more specifically to high pressure fuel metering apparatus for metering fuel to a gas turbine engine or similar apparatus in response to engine compressor pressure and modulating the fuel metered to the engine in accordance with engine speed between predetermined limits at selected governing speed including means providing primary and secondary fuel, the total fuel flow being proportional to compressor discharge pressure.

Fuel metering apparatus for turbine engines are known which meter fuel in accordance with engine speed and another engine parameter, such as compressor pressure, to maintain engine speed substantially constant at any selected speed and meter fuel in response to compressor pressure or other engine parameter only during engine acceleration and deceleration. In this regard reference is made to the commonly owned prior filed patent applications, Serial No. 143,880, filed October 9, 1961, now Patent No. 3,183,957, and Serial No. 198,158, filed May 28, 1962. These prior known fuel controls are for relatively low pressure applications and are primarily for use in installations wherein a single metered fuel flow output is required.

It is one of the objects of the present invention to provide a high pressure fuel metering control operable to meter fuel to a turbine engine or similar utilizing device in accordance with compressor pressure or similar engine parameter and to modulate the metered fuel between predetermined limits in accordance with engine speed at any selected governing speed.

Another object is to provide a fuel metering control as set forth above wherein the metered fuel is divided in a predetermined variable ratio between primary and secondary output fuel flows, but wherein the total metered fuel is proportional to compressor discharge pressure.

Another object is to provide a fuel metering control as set forth above including a positive displacement high pressure pump.

Another object is to provide a fuel metering control as set forth above including a throttling valve adjustable to compensate for different fuel metered therethrough.

Another object is to provide a fuel metering control as set forth above including electrical power turbine overspeed and pump input fuel cut-off apparatus.

Another object is to provide a fuel metering control as set forth above including means for limiting the horsepower of the engine with which it is used.

Another object is to provide a fuel metering control as set forth above including means for limiting the secondary fuel flow in accordance with a predetermined engine parameter.

Another object is to provide a high pressure gas turbine fuel control which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a diagrammatic representation of a fuel control constructed in accordance with the invention.

FRIGURE 2 is a block diagram of a turbine engine with which the fuel control of FIGURE 1 may be used.

Figure 3:
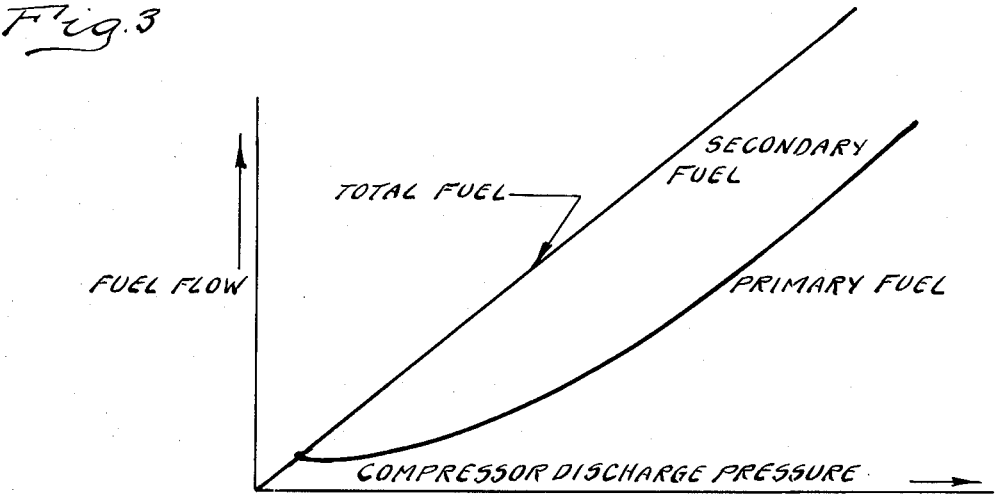

FIGURE 3 is a graphical representation of the metered fuel flow through the fuel control illustrated in FIGURE 1 showing the variable ratio maintained between the secondary fuel flow and primary fuel flow and the constant ratio between total flow and compressor discharge pressure.

With particular reference to the drawings one embodiment will now be disclosed.

Figure 2:
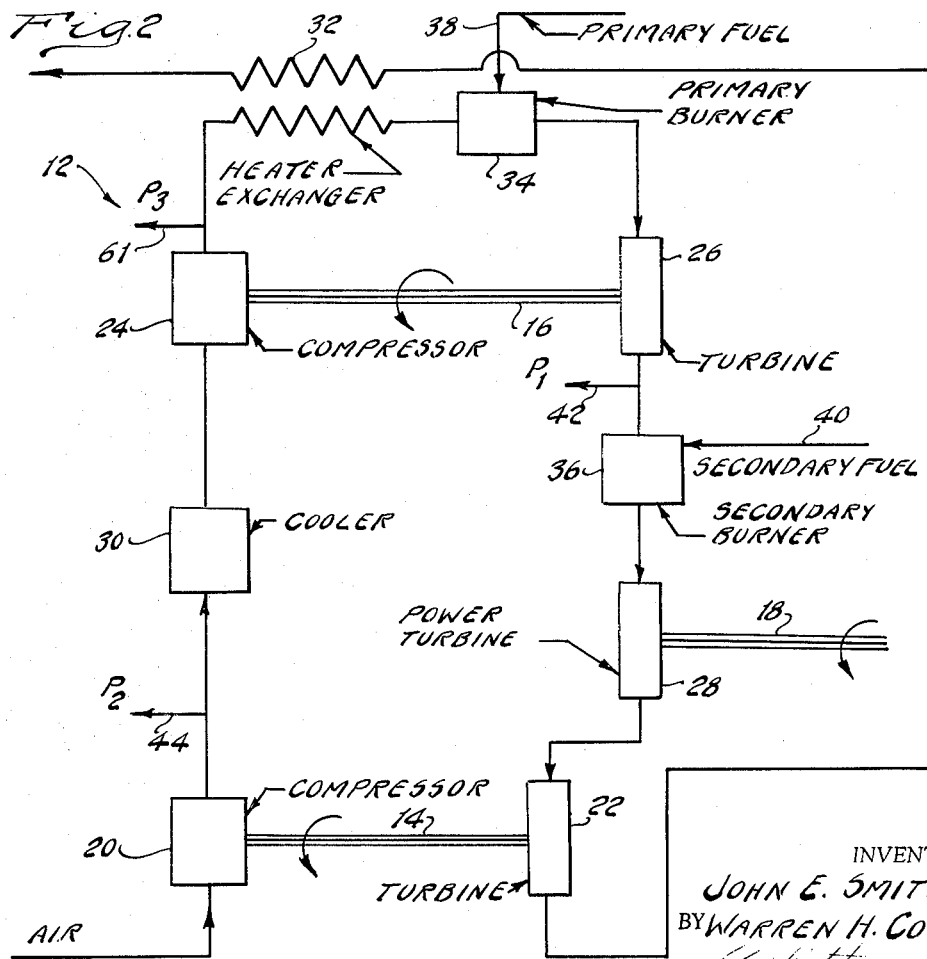

In accordance with the invention the fuel control 10 illustrated in FIGURE 1 is provided to meter primary and secondary fuel to a gas turbine engine 12 shown in block diagram form in FIGURE 2 in a predetermined variable ratio as illustrated graphically in FIGURE 3.

The engine 12 includes three separate drive shafts 14, 16 and 18 connected respectively between a first low pressure air compressor 20 and drive turbine 22 therefor, a second high pressure air compressor 24 and drive turbine 26 therefor, and the power turbine 28 and a power utilizing device such as an airplane propeller (not shown) or the like. In the engine 12 shown in FIGURE 2 the air flow is from the air intake through the compressor 20, a cooler 30, second compressor 24, a heat exchanger 32, primary burner 34, turbine 26, the secondary burner 36, power turbine 28 and turbine 22 and out of the engine through the heat exchanger 32.

As indicated in FIGURE 2 a primary fuel input is metered to the primary burner 34 through the primary fuel conduit 38 while secondary fuel is metered to the secondary burner 36 through the secondary fuel conduit 40. Pressure $P_2$ is transmitted from the compressor 20 to the fuel control 10 through pressure conduit 44 for limiting the secondary fuel metered to the secondary burner as will be considered in more detail subsequently. Pressure $P_1$ from the secondary burner input is transmitted to the fuel control 10 through pressure conduit 42 to limit the horsepower output of the engine 12, also in a manner to be more fully explained in consideration of the details of the fuel control 10.

Thus in operation of the engine 12 the air from engine air intake is first compressed in compressor 20, cooled in cooler 30, compressed again in the high pressure compressor 24, heated to a predetermined heat in the heat exchanger 32 and then is mixed with the primary fuel in the primary burner 34 in which it is ignited to produce combustion gases to operate turbine 26 which drives the high pressure compressor 24. The combustion gases from primary burner 34 after passing through turbine 26 are passed to the secondary burner 36 where they are mixed with the secondary fuel and ignited again to produce combustion gases to operate the power turbine 28 and turbine 22 which drives the low pressure compressor 20. The exhaust combustion gases from secondary burner 36 are then passed through the heat exchanger 32 and out of the engine 12.

The fuel control 10 which supplies the primary and secondary fuel to the engine 12 is positioned between a fuel tank 46 and boost pump 48 connected in series and the primary burner 34 and secondary burner 36 of the engine 12 connected in parallel. In this particular embodiment of the invention, drive shaft 50 of the fuel control 10, which is rotatably mounted in sealed bearings 52, is connected to the engine 12 by convenient means (not shown) for rotation in accordance with the speed of turbine 26.

Turbine fuel control 10 includes the positive displacement pump 54 for continuously pumping a quantity of fuel delivered to the fuel control 10 by the boost pump 48 in excess of the requirements of the engine 12. Computing mechanism 56 and governing apparatus 58 in conjunction with throttle valve assembly 59 are operable to control metering of fuel to the burners 34 and 36 at a high pressure in accordance with the discharge pressure $P_3$ of high pressure compressor 24 of engine 12 transmitted to the fuel control 10 through pressure conduit 61 and to modulate the metered fuel between predetermined limits at any selected governing engine speed.

Fuel dividing apparatus 60 is provided in the fuel control 10 to divide the fuel metered to the engine 12 between primary and secondary fuel in accordance with a predetermined variable ratio. In addition an electrical fuel cut-off and power turbine overspeed structure 62 and temperature compensating means 64 as well as secondary fuel limiting apparatus 65 and engine horsepower output limiting apparatus 67 are also provided in the fuel control 10.

The electrical fuel cut-off and power turbine overspeed structure 62, as shown in FIGURE 1, includes the solenoid 66 which is connected to the source of electrical energy 68 on closing of the automatic start switch 70 providing the power turbine overspeed switch 72 is closed. Solenoid 66 is operable on being energized to move the armature 74 to the left, as shown in FIGURE 1, in opposition to the bias of spring 76 which tends to move the armature 74 to the right into closing engagement with the fuel input orifice 78. With either the automatic start switch 70 open or on power turbine overspeed which will open the switch 72, all fuel flow into the fuel control 10 will be cut off due to the valving portion 73 of armature 74 closing fluid input orifice 78.

The placing of the fuel cut-off and power turbine overspeed structure 62 at the input to the fuel control 10 is advantageous in fuel controls wherein the fuel output is divided into a plurality of different fuel flows since a single relatively simple mechanism is operable to cut all fuel flow to the engine off with such placement. A plurality of simple mechanisms or a more complicated mechanism would be required to provide fuel cut-off at each of the plurality of output fuel flows if the fuel cut-off and power turbine overspeed structure 62 were located at the fuel output of fuel control 10 as in the past.

The positive displacement pump 54 receives the fuel at a relatively low pressure $P_4$ at its input and is operable to boost the presure up to a relatively high output pressure $P_5$. Pump 54 as previously indicated is of a size to always pump more fuel than is required by the engine 12 to which the fuel control 10 meters fuel. The excess fuel pumped by pump 54 is normally bypassed back to the pump input through the throttle valve assembly 59 as will be considered in more detail subsequently. Should the fuel pressure $P_5$ at the output of pump 54 exceed a predetermined value the pressure relief valve 80 is provided to permit direct bypassing of the excess fuel from the output conduit 82 of the pump 54 through the conduit 84 and into the return conduit 86 back to the input of the pump 54 at the relatively low return pressure $P_4$.

The governing apparatus 58 includes the lever 88 pivotally mounted at 90 which is provided with a valving surface 92 operable to control the valve orifice 94 in accordance with the pivotal position of the lever 88. Lever 88 is movable between adjustable maximum fuel flow stop 96 and minimum fuel flow stop 98 in accordance with the forces transmitted thereto through composite member 100 supported for movement in accordance with the force applied thereto by diaphragm 102 and the spring 106.

The force applied to lever 88 through composite member 100 due to diaphragm 102 is determined by the area of the diaphragm 102 and the pressure differential $P_6$ in chamber 108 minus $P_7$ in chamber 110. Pressure $P_6$ is determined by the area of the fixed orifice 112 and pump pressure $P_5$ while pressure $P_7$ is less than pressure $P_6$ by an amount proportional to engine speed squared.

The hydraulic speed sense 114 controls the pressure difference $P_6-P_7$ since as the shaft 50 is rotated in accordance with the speed of turbine 26, the centrifugal valve member 116 is moved in accordance therewith or radially outwardly at higher engine speeds to more nearly close the valve orifice 118 and provide a greater pressure drop across the hydraulic resistor. Thus at greater engine speeds the pressure difference $P_6-P_7$ is greater than at lower engine speeds so that as engine speed increases the lever 88 tends to move clockwise under the influence of the pressure differential across the diaphragm 102 to perform a governing function as will be considered in more detail subsequently.

The force applied to the lever 88 through composite member 100 by the spring 106 is determined primarily by the position of the retaining cup 120 for the spring 106. The position of the retaining cup 120 is determined by the lever 122 which is pivotally mounted at 124 and is pivoted in accordance with the cam surface 126. Cam surface 126 is rotatable by the external fuel control lever 128 which is positionable to determine a selected engine governing speed. The adjustable idle abutment 130 is provided in conjunction with the lever 122 to provide a minimum setting of the lever 122 sufficient to permit the fuel control 10 to meter idle fuel to the engine 12.

The throttle valve assembly 59 comprises the valve orifice 134 operable to connect the chamber 110 with the low pressure return conduit 86 through conduit 136 which is maintained at the low return pressure $P_4$. The valve orifice 134 is controlled by means of valve member 138 supported by diaphragm 140 and movable toward and away from the valve orifice 134 in accordance with the pressure $P_8$ in chamber 142 and pressure $P_7$ in chamber 110 and the bias of springs 144 and 146 acting thereon. The force of springs 144 and 146 is varied by means of the adjustable plug 148 whereby the same throttling characteristics may be maintained in the fuel control 10 for fuels having different characteristics such as density.

Computing mechanism 56 comprises the pivotally mounted lever 150, the pivotal mounting 152 of which is shown displaced at ninety degrees for clarity. The valve orifice 154 is controlled by the valving surface 156 of the lever 150. Lever 150 is pivoted about the pivot mounting means 152 in accordance with the forces applied thereto through the rigid connection therewith of pin 158 secured to the composite member 160, the movement of which is controlled by the diaphragms 162 and 164.

Movement of the lever 150 is further controlled in accordance with the force applied to the lever extension 166 by means of the evacuated bellows 168 and the spring 170 through member 172. Lever extension 166 is rigidly secured to the lever 150 for movement therewith. Spring 170 is adjustably tensioned by means of the adjusting screw 176 and retaining cup 178 therefor. The force provided by bellows 168 is varied in accordance with compressor discharge pressure $P_3$ and further provides a limit on the horsepower of the engine to which the fuel control 10 meters fuel as well be considered subsequently.

Fuel flow through the fuel control 10 from the pump 54 is divided between that required to sense engine speed which is removed from conduit 82 through conduit 84 and fixed orifice 112, excess pump capacity which is returned to the chamber 110 through the conduit 180 in accordance with the position of the lever 150 and the fuel flow past the restricting orifice 184 which may be indicated was $W_f+q$ where $W_f$ is the fuel metered to the engine 12 and $q$ or governing fuel is a quantity of fuel also in excess of the required capacity pumped by the pump and which is used in governing the speed of engine 12 and which is recirculated.

Thus it will be readily recognized that the pressure difference $P_5-P_8$ which is proportional to the square of the fuel flow through the orifice 184 will be proportional to $W_f^2+2qW_f+q^2$ which pressure difference is found across chamber 186 and 188 connnected to conduit 82 through conduits 192 and 194.

The governing fuel $q$ is returned to the chamber 110 through the conduit 196. Engine fuel $W_f$ proceeds through the orifice 198 creating a pressure difference $P_8-P_9$ across orifice 198 which is proportional to $W_f^2$. $P_9$ is transmitted to chambers 200, 202 and 204 through conduits 206, 208 and 210 respectively.

Thus it will be seen that the forces acting on the lever 150 which determine the position of the valve surface 156 comprise a force proportional to $W_f^2+2qW_f+q^2$ acting downwardly and a force $W_f^2$ acting upwardly due to the enlarged diameter of diaphragm 164 as compared to the diameter of diaphragm 162. In addition it can be seen that the force of spring 170 may be set to counteract the $q^2$ force acting downwardly on the lever 150 through pin 158. Thus the force provided on the lever 150 by the bellows 168 which is proportional to the discharge pressure of compressor 24 or $P_3$ may be equated to the force $2qW_f$ whereby the force $W_f$ tending to rotate the lever 150 about the pivot mounting 152 or in other words the total fuel flow metered to the engine 12 will be proportional to compressor pressure when governing fuel flow $q$ is a constant as it will be during acceleration or deceleration schedules as well be more evident when the operation of the governing apparatus 58 and computing mechanism 56 is considered.

In considering the over-all operation of the governing apparatus 58 and computing mechanism 56 of the fuel control 10 it will be assumed that the engine 12 is operating in a steady state condition above idle speed with the lever 128 of the governing apparatus 58 rotated so that lever 122 positions cup 120 to provide a spring force 106 acting on lever 88 which is sufficient to maintain the lever 88 some place between the maximum and minimum fuel flow abutments 96 and 98 in conjunction with the pressure differential $P_6-P_7$ across diaphragm 102. If the engine should then slow down as sensed by the speed sense 114 rotatable with shaft 50 at a speed proportional to engine speed the valve 116 would be forced inwardly by the pressure $P_6$ acting in opposition to centrifugal force thereon whereby the pressure $P_6$ would decrease to some value closer to $P_7$ so that the pressure differential $P_6-P_7$ would be smaller and the lever 88 would be pivoted toward the maximum fuel flow abutment 96.

Pivoting of the lever 88 toward the abutment 96 would more nearly close the valve orifice 94 to restrict the recirculated $q$ fuel flow whereby less fuel is bypassed back to the input of pump 50 through conduit 196 and chamber 110 and more fuel is metered to the engine 12 through orifice 198 in accordance with the relation $P_3=2qW_f$. The speed of the engine 12 will thus be brought back to the selected governing speed.

If the speed of the engine 12 is increased the lever 88 would tend to pivot clockwise about the pivot mounting 90 thereof toward abutment 98 whereby the orifice 94 would be opened to a greater degree, the recirculated portion $q$ of the fuel flow $W_f+q$ would be increased and the fuel flow $W_f$ to the engine 12 decreased to lower the engine speed to governed speed as set by lever 128 again in accordance with the relation $P_3=2qW_f$ wherein $q$ is a multiplier and therefore of more signficance than $q$ in the relation $W_f+q$ equals a constant.

During such governing action the lever 150 which controls the amount of fuel pumped by pump 54 which is returned to the pump 54 through conduit 180, chamber 110 and throttle valve assembly 59 is also positioned in accordance with governing fuel flow $q$ and engine fuel flow $W_f$ as sensed across diaphragms 162 and 164 and in accordance with engine compressor pressure $P_3$ as sensed by evacuated bellows 168 in accordance with the above considered relation $P_3=2qW_f$.

As long as the lever 88 moves between the stops 96 and 98 the primary control of the fuel flow through the fuel control 10 is by the governing mechanism 58. However, when it is desired to accelerate or decelerate the engine, as will be accomplished through resetting of the lever 128, the computer mechanism controls the metering of the total fuel to the engine 12 in accordance with engine compressor pressure substantially independently of the governing apparatus since lever 88 at this time will be in abutment with either the maximum fuel flow stop 96 or the minimum fuel flow stop 98. With lever 88 against stop 96 or 98 the valve orifice 94 is a constant area. The pressure drop across the constant area is maintained constant by the throttle valve assembly 59 so that governing fuel flow $q$ will be a constant.

Therefore, during acceleration and deceleration with the diaphragms 162 and 164 and the bellows 168 properly sized, the length of lever 150 between mounting 152 and pin 158 and the length of lever extension 166 correctly selected, and the spring 170 chosen to have a predetermined spring force so that the $q^2$ force is cancelled, the fuel flow $W_f$ will be proportional to engine compressor pressure $P_3$ in accordance with the equation $P_3$ is proportional to $2qW_f$ as set forth above.

Since the spring 170 is not normally changed between acceleration and deceleration schedules it will be recognized that the spring 170 if it cancels out the $q^2$ term in the above equation during acceleration will not completely cancel out the $q^2$ term during deceleration since governing fuel flow $q$ at these times will be constant but different owing to the different opening of valve orifice 94 with the lever 88 abutting the abutments 96 and 98. Spring force 170 is therefore chosen to cancel the $q^2$ force during for example acceleration which is the most critical condition. When $q$ changes the proportionality between $P_3$ and $W_f$ changes as seen in the equation $P_3=2qW_f$. Therefore, the deceleration schedule would basically be a percentage of the acceleration schedule. This would be the precise result if the spring 170 were to change its force to constantly cancel out $q^2$. However, the effect of not changing the force in the spring 170 would be to change the basic deceleration schedule by approximately a constant value.

The compressor discharge pressure $P_3$ force is varied by means of the temperature compensating apparatus 64 to compensate for different engine air input temperatures. Apparatus 64 may for example sense either compressor inlet temperature or burner inlet temperature and functions to modify the compressor discharge pressure $P_3$ to lower the fuel flow with increases in temperature.

Apparatus 64 includes the valve member 214 positioned in the pressure conduit line 216 to restrict the vent passage 218 which vents conduit 216 to atmosphere. The valve member 214 is guided by means of the hat-shaped mounting bracket 220 therefor and is urged toward the venting passage 218 by the spring bias means 222. The bi-metallic discs 224 operating between the end of the hat-shaped member 220 and the enlarged end 226 of the valve member 214 are exposed to the temperature by which it is desired to regulate the fuel flow through the openings 228 in the shield 230 placed therearound. The air is metered into the conduit 216 through the restriction 232 from the compressor discharge conduit 61.

A second valve member 234 is positioned in the conduit 216 downstream of the temperature compensating apparatus 64 which valve is supported on member 236 and diaphragm 238 and is urged toward the atmospheric exhaust passage 240 by the adjustable spring 242. The chamber 244 is exposed to atmospheric pressure while the chamber 246 is exposed to the low pressure compressor discharge pressure $P_2$. Thus in operation the horsepower output of the engine 12 may be effectively limited by varying the pressure $P_{10}$ acting on bellows 168 in accordance with the low pressure compressor discharge pressure $P_2$. The horsepower limit may be established by positioning of the plug 248.

Fuel flow $W_f$ passing through the restriction 198 is divided into primary and secondary fuel flow as previously indicated. Thus primary fuel flow is provided through conduit 208, valve orifice 250, past cut-off valve 252 and into primary fuel conduit 38 in accordance with pressure difference $P_8$–$P_9$ across the diaphragm 254. The pressure difference $P_8$–$P_9$ across diaphragm 254 positions valve 256 with respect to the valve orifice 250 in opposition to the bias spring 258.

In other words since the computer mechanism 56 has meter fuel flow $W_f$ to the orifice 198, and since this orifice is fixed in area, the pressure drop $P_8$–$P_9$ provides an indication at the diaphragm 164 of the computer mechanism 56 that the metered amount of fuel is correct. The pressure drop $P_8$–$P_9$ can thus be used as an indication of total fuel flow.

The position of valve 256 provides a pressure difference $P_9$ to $P_{11}$ across the valve orifice 250 so that the pressures acting on the diaphragm 260 and valve member 262 which regulate the secondary fuel metering orifice 264 varies in accordance with pressure difference $P_9$–$P_{11}$. The pressure difference $P_9$–$P_{11}$ in opposition to bias spring 266 positions the valve 262 with respect to the orifice 264 so that the secondary fuel flow provides a pressure difference $P_9$–$P_{12}$ across the orifice 264 and a secondary fuel flow in conduit 40 which is the difference between the fuel flow $W_f$ through orifice 198 and the primary fuel flow through valve orifice 250.

The cut-off valve 252 is provided in conjunction with the cam 268 to positively shut off the primary fuel when the cam 268 which may be mechanically connected to the lever 128 is rotated to cause movement of the valve 252 to its rightward limiting position. The valve 252 is normally urged by spring 270 toward its rightwardmost position whereby cut-off valve 252 also acts as a pressurizing valve for the fuel control 10. This insures that the pump pressure rise is never less than a predetermined quantity related to the force of spring 270 whereby a pressure differential sufficient to operate all hydraulic circuits and to permit bypassing fuel flow in control 10 is maintained at all times.

Secondary fuel may be bypassed to the low pressure return conduit 86 through conduits 272 and 274 on movement of the valve 276 to the right from the position thereof shown in FIGURE 1. Valve 276 is supported for movement in passage 278 by diaphragm 280 and member 282. Diaphragm 280 and member 282 are urged to the left by spring 284 and to the right by the pressure $P_1$ which is transmitted thereto from the high pressure compressor turbine 26 through conduit 42. Bypassing of the secondary fuel back to the pump input effectively limits the power turbine output to prevent power turbine overspeed. The speed at which the power turbine is limited is adjustable by means of the adjusting plug 288.

The drawings and the foregoing specification constitute a description of the improved fuel control in such full, clear, concise and exact terms as to enable any person skilled in the art to practice the invention, the scope of which is indicated by the appended claims.

What we claim as our invention is:

1. A fuel control for metering fuel from a fuel source to a turbine engine comprising a fuel conduit extending between the fuel source and turbine engine, a first and second fixed restriction in said fuel conduit, a pump operably associated with said conduit for pumping fuel from said fuel source into said conduit always in excess of the fuel requirements of said engine, a pressure regulating check valve connected in parallel with said pump for bypassing fuel from the output to the input thereof a a throttle valve, engine compressor pressure responsive computing mechanism operably associated with said throttle valve and connected to said conduit between the pump and first restriction for returning a portion of the fuel in excess of engine requirements to the input side of said pump, governing apparatus connected to said conduit between said first and second restriction and operably associated with said computing mechanism and throttle valve for modulating the fuel passing through the second restriction in accordance with engine speed and means connected to the conduit between the second restriction and engine responsive to the pressure drop across the second restriction for dividing the fuel into primary and secondary engine fuel in a predetermined variable proportion.

2. Structure as set forth in claim 1 wherein the computing mechanism includes a valve orifice through which fuel is returned to the input side of said pump, a lever pivotally mounted centrally having a valve surface on one end thereof positioned adjacent the valve orifice for varying the opening of the valve orifice to regulate the quantity of fuel returned to the input side of the pump in accordance with the pivotal position of the lever and pressure responsive means engaged with the other end of the lever responsive to engine compressor pressure for pivoting the lever in accordance with engine compressor pressure.

3. Structure as set forth in claim 2 wherein the computing mechanism further includes a pair of spaced apart diaphragms defining three separate chambers within the fuel control, means for connecting the first of said chambers to the fuel conduit between the pump and first restriction, means for connecting the second of said chambers to the fuel conduit between the second restriction and engine, and means for connecting the third of said chambers to the fuel conduit between the first and second restriction, means connecting the diagrams for movement together and means connecting said diaphragms to said lever to produce movement thereof in accordance with the movement of said diaphragms.

4. Structure as claimed in claim 1 wherein one governing apparatus includes a valving orifice through which fuel in said fuel conduit is metered for return to the pump input to modulate the fuel metered to the engine, a lever pivotally mounted at one end having a valving surface thereon operable to vary the orifice in accordance with the pivotal position of said lever, a pair of stops on opposite sides of the other end of said lever, resilient means for biasing said lever toward one of said stops operable to establish a predetermined governing speed, diaphragm means, a hydraulic speed sense for creating a pressure differential across said diaphragm means in accordance with engine speed, and means connected to said diaphragm means engageable with said lever operable to pivot said lever between said stops in opposition to said relisient means in accordance with the pressure differential across the diaphragm means.

5. Structure as set forth in claim 4 wherein said throttle valve comprises a valve orifice through which fuel is metered back to the input side of the pump, a diaphragm mounted valve member operable to regulate the valve orifice, settable resilient means biasing said valve member in a predetermined direction and means for applying the pressure differential between the output pressure of the speed sense and the pressure in the fuel conduit between the first and second restrictions across the diaphragm mounted valve member.

6. Structure as set forth in claim 1 wherein the means for dividing the fuel metered through said second fixed restriction comprises a first diaphragm, a valve member located in the fuel conduit between the second restriction and engine and secured to said first diaphragm for movement therewith, means for connecting one side of said first diaphragm to the fuel conduit between the first and second restrictions, means for connecting the other side of the first diaphragm to the fuel conduit between the second fixed restriction and the valve whereby the valve member is positioned in accordance with the pressure drop across the second restriction to provide a primary fuel flow therethrough and produce a pressure drop thereacross, a second diaphragm mounted valve in said fuel conduit controlling the flow of secondary fuel, and means for applying the pressure drop across said first valve to said second valve to determine the amount of secondary fuel flow through said second valve.

7. Structure as set forth in claim 6 and further including means for limiting the portion of secondary fuel flow delivered to the engine in accordance with a predetermined engine parameter.

8. A fuel control for metering fuel from a fuel source to a turbine engine comprising a fuel conduit extending between the fuel source and turbine engine, a first and second fixed restriction in said fuel conduit, a pump operably associated with said conduit for pumping fuel from said fuel source into said conduit always in excess of the fuel requirements of said engine, a pressure regulating check valve connected in parallel with said pump for bypassing fuel from the output to the input thereof, a throttle valve, engine compressor pressure responsive computing mechanism operably associated with said throttle valve and connected to said conduit between the pump and first restriction for returning a portion of the fuel in excess of engine requirements to the input side of said pump, and governing apparatus connected to said conduit between said first and second restrictions and operably associated with said computing mechanism and throttle valve for modulating the fuel passing through the second restriction in accordance with engine speed.

9. Structure as set forth in claim 8 wherein the computing mechanism includes a valve orifice through which fuel is returned to the input side of said pump, a lever pivotally mounted centrally having a valve surface on one end thereof positioned adjacent the valve orifice for varying the opening of the valve orifice to regulate the quantity of fuel returned to the input side of the pump in accordanme with the pivotal position of the lever and pressure responsive means engaged with the other end of the lever responsive to engine compressor pressure for pivoting the lever in accordance with engine compressor pressure.

10. Structure as set forth in claim 9 wherein the computing mechanism further includes a pair of spaced apart diaphragms defining three separate chambers within the fuel control, means for connecting the first of said chambers to the fuel conduit between the pump and first restriction, means for connecting the second of said chambers to the fuel conduit between the second restriction and engine, and means for connecting the third of said chambers to the fuel conduit between the first and second restriction, means connecting the diaphragms for movement together and means connecting said diaphragms to said lever to produce movement thereof in accordance with the movement of said diaphragms.

11. Structure as claimed in claim 8 wherein the governing apparatus includes a valving orifice through which fuel in said fuel conduit is metered for return to the pump input to modulate the fuel metered to the engine, a lever pivotally mounted at one end having a valving surface thereon operable to vary the orifice in accordance with the pivotal position of said lever, a pair of stops on opposite sides of the other end of said lever, resilient means for biasing said lever toward one of said stops operable to establish a predetermined governing speed, diaphragm means, a hydraulic speed sense for creating a pressure differential across said diaphragm means in accordance with engine speed, and means connected to said diaphragm means engageable with said lever operable to pivot said lever between said stops in opposition to said resilient means in accordance with the pressure differential across the diaphragm means.

12. Structure as set forth in claim 11 wherein said throttle valve comprises a valve orifice through which fuel is metered back to the input side of the pump, a diaphragm mounted valve member operable to regulate the valve orifice, settable resilient means biasing said valve member in a predetermined direction and means for applying the pressure differential between the output pressure of the speed sense and the pressure in the fuel conduit between the first and second restrictions across the diaphragm mounted valve member.

13. A fuel control for metering fuel from a fuel source to a turbine engine which engine includes a high pressure compressor, a high pressure compressor turbine driving the high pressure compressor, a primary fuel burner positioned between the high pressure compressor and the high pressure compressor turbine, a power turbine and a secondary fuel burner positioned between the high pressure compressor turbine and the power turbine, said fuel control comprising a fuel conduit extending between the fuel source and the turbine engine, a first and second fixed restriction in said fuel conduit, a pump for pumping fuel from said fuel source into said conduit always in excess of the fuel requirements of said engine, a throttle valve, engine compressor pressure responsive computing mechanism operably associated with said throttle valve and connected to said conduit between the pump and first restriction for returning a portion of the fuel in excess of engine requirements to the input side of said pump including a valve orifice through which fuel is returned to the input side of said pump, a lever pivotally mounted centrally having a valve surface on one end thereof positioned adjacent the valve orifice for varying the opening of the valve orifice to regulate the quantity of fuel returned to the input side of the pump in accordance with the pivotal position of the lever, pressure responsive means engaged with the other end of the lever responsive to engine compressor pressure for pivoting the lever in accordance with engine compressor pressure, a pair of spaced apart diaghragms defining three separate chambers within the fuel control means for connecting the first of said chambers to the fuel conduit between the pump and first restriction, means for connecting the second of said chambers to the fuel conduit between the second restriction and engine and means for connecting the third of said chambers to the fuel conduit between the first and second restrictions, means connecting the diaphragms for movement together and means connecting said diaphragms to said lever to produce movement thereof, in accordance with the movement of said diaphragms, governing apparatus connected to said conduit between said first and second restrictions and operably associated with said computing mechanism and throttle valve for modulating the fuel passing through the second restriction in accordance with engine speed, and means connected to the conduit between the second restriction and engine responsive to the pressure drop across the second restriction for dividing the fuel into primary and secondary engine fuel in a predetermined variable proportion and means for passing the primary fuel to the primary burner of the engine and the secondary fuel to the secondary burner of the engine.

14. A fuel control for metering fuel from a fuel source to a turbine engine which engine includes a high pressure compressor, a high pressure compressor turbine driving the high pressure compressor, a primary fuel burner positioned between the high pressure compressor and the high pressure compressor turbine, a power turbine and a secondary fuel burner positioned between the high pressure compressor turbine and the power turbine, said fuel control comprising a fuel conduit extending between the fuel source and the turbine engine, a first and second fixed restriction in said fuel conduit, a pump for pumping fuel from said fuel source into said conduit always in excess of the fuel requirements of said engine, a throttle valve, engine compressor pressure responsive computing mechanism operably associated with said throttle valve and connected to said conduit between the pump and first restriction for returning a portion of the fuel in excess of engine requirements to the input side of said pump, governing apparatus connected to said conduit between said first and second restrictions and operably associated with said computing mechanism and throttle valve for modulating the fuel passing through the second restriction in accordance with engine speed, including a valve orifice through which fuel in said fuel conduit is metered for return to the pump input to modulate the fuel metered to the engine, a lever pivotally mounted at one end having a valving surface thereon operable to vary the orifice in accordance with the pivotal position of said lever, a pair of stops on opposite sides of the other end of said lever, resilient means for biasing said lever toward one of said stops operable to establish a predetermined governing speed, diaphragm means, a hydraulic speed sense for creating a pressure differential across said diaphragm means in accordance with engine speed, and means connected to said diaphragm means engageable with said lever operable to pivot said lever between said stops in opposition to said resilient means in accordance with the pressure differential across the diaphragm means, and means connected to the conduit between the second restriction and engine responsive to the pressure drop across the second restriction for dividing the fuel into primary and secondary engine fuel in a predetermined variable proportion and means for passing the primary fuel to the primary burner of the engine and the secondary fuel to the secondary burner of the engine.

15. Structure as set forth in claim 14 wherein said throttle valve comprises a valve orifice through which fuel is metered back to the input side of the pump, a diaphragm mounted valve member operable to regulate the valve orifice, settable resilient means biasing said valve member in a predetermined direction and means for applying the pressure differential between the output pressure of the speed sense and the pressure in the fuel conduit between the first and second restrictions across the diaphragms mounted valve member.

16. A fuel control for metering fuel from a fuel source to a turbine engine which engine includes a high pressure compressor, a high pressure compressor turbine driving the high pressure compressor, a primary fuel burner positioned between the high pressure compressor and the high pressure compressor turbine, a power turbine and a secondary fuel burner positioned between the high pressure compressor turbine and the power turbine, said fuel control comprising a fuel conduit extending between the fuel source and the turbine engine, a first and second fixed restriction in said fuel conduit, a pump for pumping fuel from said fuel source into said conduit always in excess of the fuel requirements of said engine, a throttle valve, engine compressor pressure responsive computing mechanism operably associated with said throttle valve and connected to said conduit between the pump and first restriction for returning a portion of the fuel in excess of engine requirements to the input side of said pump, governing apparatus connected to said conduit between said first and second restrictions and operably associated with said computing mechanism and throttle valve for modulating the fuel passing through the second restriction in accordance with engine speed, and means connected to the conduit between the second restriction and engine responsive to the pressure drop across the second restriction for dividing the fuel into primary and secondary engine fuel in a predetermined variable proportion and means for passing the primary fuel to the primary burner of the engine and the secondary fuel to the secondary burner of the engine.

References Cited by the Examiner

UNITED STATES PATENTS

| | | | |
|---|---|---|---|
| 2,452,088 | 10/1948 | Whitehead | 137—26 |
| 2,605,610 | 8/1952 | Hermitte et al. | |
| 2,667,743 | 2/1954 | Lee | 60—39.28 |
| 2,668,416 | 2/1954 | Lee | 60—39.28 |
| 2,691,268 | 10/1954 | Prentiss | 60—39.28 |
| 2,765,800 | 10/1956 | Drake | 137—26 |
| 2,848,870 | 8/1958 | Eastman | 60—39.28 |
| 2,910,125 | 10/1959 | Best | 60—39.28 |
| 2,916,876 | 12/1959 | Colley | 60—39.28 |
| 2,943,447 | 7/1960 | Davies | 60—39.28 |
| 2,947,141 | 8/1960 | Russ | 60—39.28 |
| 2,996,883 | 8/1961 | Fortmann | 60—39.28 |
| 3,002,348 | 10/1961 | Haase | 60—39.28 |
| 3,041,826 | 7/1962 | Coar. | |
| 3,067,580 | 12/1962 | Kast | 60—39.28 |
| 3,073,115 | 1/1963 | Cowles | 60—39.28 |
| 3,104,524 | 9/1963 | Flanders | 60—39.16 |
| 3,118,491 | 1/1964 | Simons | 60—39.28 |
| 3,123,089 | 3/1964 | Thrap | 137—101 |
| 3,125,110 | 3/1964 | Allen | 137—101 |
| 3,131,750 | 5/1964 | Turner | 60—39.28 X |
| 3,142,259 | 7/1964 | Tyler | 60—39.28 X |

FOREIGN PATENTS

| | | |
|---|---|---|
| 620,983 | 4/1949 | Great Britain. |
| 710,261 | 6/1954 | Great Britain. |
| 800,394 | 8/1958 | Great Britain. |

JULIUS E. WEST, *Primary Examiner.*

SAMUEL LEVINE, MARK NEWMAN, *Examiners.*